Patented Dec. 22, 1931

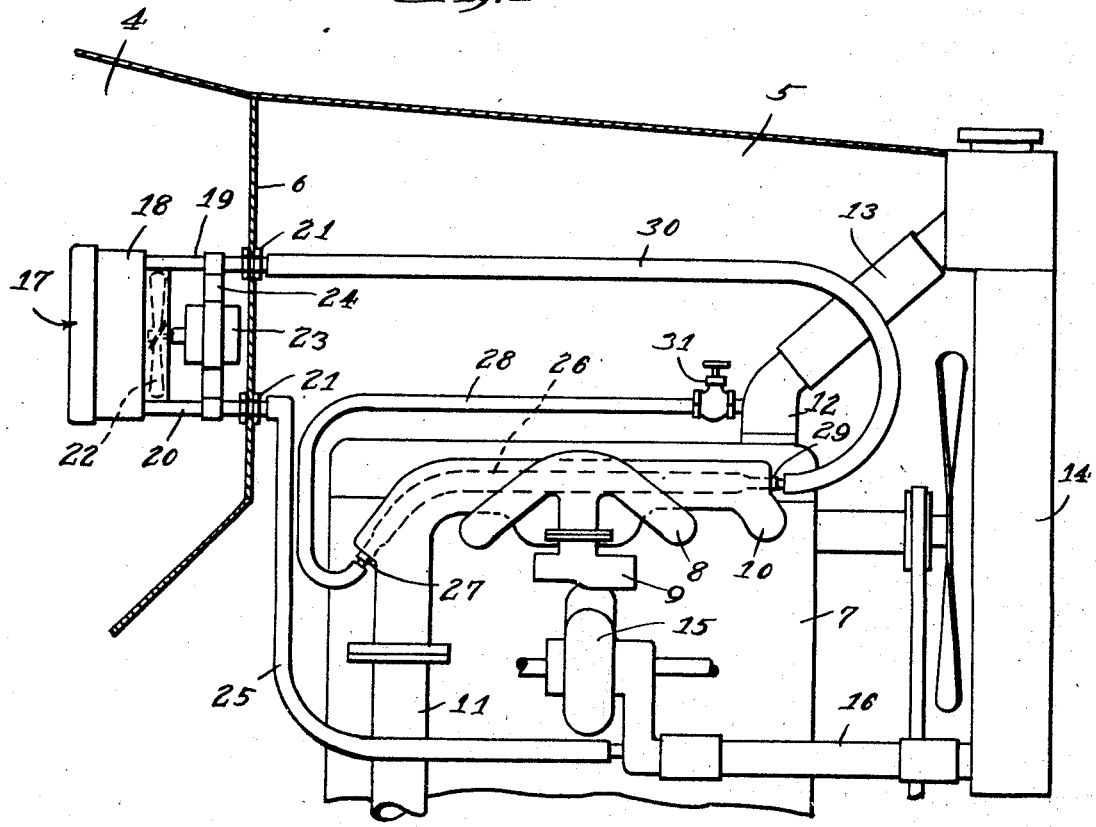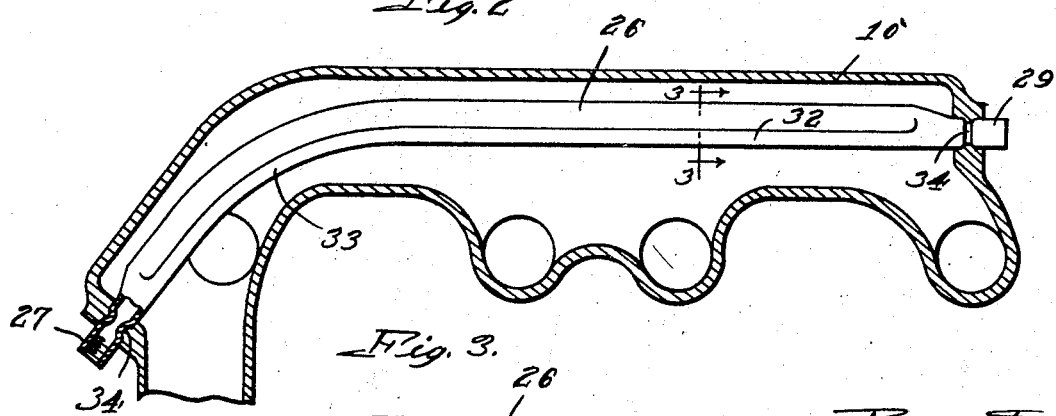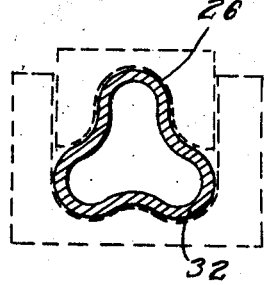

1,837,647

UNITED STATES PATENT OFFICE

ALBERT H. BATES, OF ROCKFORD, ILLINOIS, ASSIGNOR TO BURD HIGH COMPRESSION RING COMPANY, OF ROCKFORD, ILLINOIS, A CORPORATION OF ILLINOIS

HEATING SYSTEM FOR AUTOMOTIVE VEHICLES

Application filed June 13, 1930. Serial No. 460,998.

This invention relates to heating systems for automotive vehicles and particularly those utilizing the engine cooling fluid as the heating medium.

In heating systems of the kind referred to it has been the practice to circulate the fluid through the heater at the temperature attained in the engine jacket. Some cars have thermostatic means to control the passage of the fluid to the radiator so that a certain temperature must be reached before the heat thereof is dissipated in the radiator, whereby to insure more efficient operation of the engine. In such cases the temperature of the fluid ranges between 120° and 180° F., depending on the setting of the thermostat. Where the lower temperatures are maintained it is quite a problem to provide a heater that will have a heat transfer element of sufficient capacity to properly heat the car, especially in the coldest weather. Furthermore, one of the most serious objections to that type of heating system has been that it is too slow in heating up, there being no heat available for several minutes after starting of the engine.

My invention has for its principal object the provision of a "booster" for raising the temperature of or vaporizing that portion of the cooling fluid that is circulated through the heater, the same consisting of a specially constructed heating coil or pipe extended through the exhaust manifold and so designed that there is a very efficient heat transfer from the exhaust gases to the fluid circulated through the pipe. The fact that the heating medium is thus made available at a higher temperature makes it possible to properly heat the car with a heater of much smaller size and weight and proportionately lower cost, and, not only that, but also makes it possible to secure heat practically immediately after starting of the engine.

The invention is illustrated in the accompanying drawings, in which—

Figure 1 is a more or less diagrammatic view of the heating system embodying my invention;

Fig. 2 is an enlarged, longitudinal, vertical section through the exhaust manifold showing the booster of my invention provided therein, and Fig. 3 is a cross-section through the booster pipe taken on the line 3—3 of Fig. 2.

The same reference numerals are applied to corresponding parts throughout the views.

The heating system is herein illustrated as applied to an automobile for heating the tonneau or passenger compartment 4 which is separated from the engine compartment 5 by the dash 6. The invention is, however, applicable to any automotive vehicle. The engine 7 has an intake manifold 8 connected with the carburetor 9 and has an exhaust manifold 10 connected with the exhaust pipe 11. An elbow 12, in which a thermostat is suitably provided for controlling the flow of cooling fluid from the jacket of the engine 7 through the hose connection 13 to the usual radiator 14, is on the pressure side of the fluid circulating pump 15. The latter has communication with the engine jacket on its pressure side and on its suction side has connection with the lower end of the radiator 14 through the lower hose connection 16. The heater, shown at 17, is of the type covered in my application Serial No. 311,032, filed October 8, 1928, having a radiator core to serve as a heat transfer element provided inside a shroud 18. Supply and return pipes 19 and 20 are connected with the top and bottom headers of the radiator core of the heater and serve to support the heater on the dash 6 by clamping of the pipes thereon, as indicated at 21. A fan 22, driven by an electric motor 23 supported between the pipes 19 and 20 on a bracket 24, is arranged to produce a forced draft of clean, fresh air through the radiator of the heater from the back thereof so as to distribute the heat to all parts of the tonneau. It has been the practice in the past to simply connect the supply pipe 19 with the engine jacket at the head or outlet connection so as to deliver the cooling fluid to the heater at the highest available temperature. The return pipe 20 was connected similarly as herein shown by a hose 25 tapped into the lower hose connection of the radiator 14 between the latter and the pump 15. In that way, the hot water or whatever cooling fluid is used was supplied to the radiator of the heater directly from the engine jacket through the supply pipe 19 for passage downwardly through the radiator and back to the engine jacket through the return pipe 20. The objections to such a system were pointed out above; the fluid delivered to the heater was at or slightly below the temperature attained in the engine jacket and hence did not, in many cases, furnish sufficient heat for proper heating of a car with a heater of as small size as it is desired to install, and, furthermore, it took too long for the fluid to become heated sufficiently to give off perceptible heat at the heater. The present invention, as will now be described, avoids these objections and makes it possible to secure heat practically immediately after starting the engine and the heating medium is brought to a sufficiently high temperature so that a car can be properly heated even in the coldest weather with a heater of much smaller size than was otherwise required.

According to my invention a booster coil or pipe 26 is provided in the exhaust manifold 10 having its inlet end 27 connected by means of a hose 28 with the elbow 12 and having its outlet end 29 connected by means of a hose 30 with the supply pipe 19 of the heater. In that way, the fluid delivered from the engine jacket is heated to a temperature above that attained in the jacket and is then circulated through the heater. Obviously, if the heater is turned on immediately after starting the engine the fluid delivered from the jacket may be only luke-warm but after passage through the booster pipe will be hot enough to give off a fair amount of heat at the heater. In other words, there is no need for waiting until the engine has warmed up. A valve 31 is provided between the elbow 12 and hose 28 for regulating the flow of the fluid through the system and when it is set to restrict the flow sufficiently with reference to the heating capacity of the booster pipe, steam is formed for circulation through the heater.

The installation of the booster pipe in the exhaust manifold presents certain problems. First of all, it is desired to secure a large amount of heating surface in relation to a restricted cross-sectional area of the passage through the pipe, so as to make for the most efficient heat exchange between the exhaust gases and the water or other fluid in the flow thereof through the pipe from one end of the exhaust manifold to the other. With that object in view I form the pipe to a clover-leaf cross-section, as illustrated in Fig. 3, thereby providing three longitudinally extending hollow ribs or beads 32 in which narrow channels are provided for the passage of the fluid, and the fact that these channels are exposed to the heat of the exhaust gases from all sides except at the center of the pipe insures very efficient heat transfer from the gases to the fluid. Furthermore, there is less obstruction to the flow of the exhaust gases through the manifold with a booster pipe reduced in cross-section as just described. The pipe is seamless and made of an alloy steel which permits of its being formed between dies to the clover-leaf cross-section in the manner indicated in dotted lines in Fig. 3. Secondly, the difference between the coefficients of expansion of the alloy steel of the booster pipe and the cast iron of the manifold makes it imperative that some provision be made to allow for expansion and contraction of the pipe relative to the manifold. I obtain that result by forming the pipe with a bend near one end thereof, as indicated at 33. This permits the fastening of the pipe rigidly at both ends for gas-tight joints without danger of one of the joints being opened up under the end thrust incident to the pipe having expansion or contraction different from the manifold. In other words, the pipe, by virtue of the fact that it has the bend in it and is out of contact with the inside of the manifold from end to end thereof is arranged simply to flex one way or the other under expansion or contraction and the joints at opposite ends thereof are not subjected to enough end thrust to affect the same in any way. Furthermore, the provision of the bend near the inlet end 27 is of advantage in that the pipe follows the downward curvature of the exhaust manifold and there is, therefore, that much more length of pipe exposed in the manifold to the heat of the exhaust gases and consequently better heat exchange between the exhaust gases and the fluid. Thirdly, the fact that the booster pipe is preferably bent and of the peculiar cross-section described makes it necessary to cast the pipe in place. In order to make a good joint I prefer to swedge the ends 27 and 29 of the pipe to a slightly smaller cross-section than the rest of the pipe and to form therein annular grooves 34 into which the metal of the manifold is arranged to flow and take a good purchase on the pipe and make for a joint which cannot possibly open up under the slight end thrust to which the same will be subjected in the expansion and contraction of the pipe. The ends 27 and 29 are preferably internally threaded to receive nipples for connection of the hoses 28 and 30 therewith.

It is believed the foregoing description conveys a good understanding of all of the objects and advantages of my invention. The appended claims have been drawn with a view to covering all legitimate modifications and adaptations.

I claim:

In a heating system for motor vehicles comprising means for heating fluid by heat transfer from the exhaust gases of the motor vehicle, the combination with an exhaust manifold arranged to have exhaust gases passed therethrough, of a pipe extending into and out of said manifold for the purpose of conducting fluid to be heated into and out of said manifold, said pipe having annular grooves therein at the inlet and outlet ends thereof and being cast in place at the grooved portions in the wall of the manifold substantially as described.

In witness of the foregoing I affix my signature.

ALBERT H. BATES.